ABSTRACT# United States Patent [19]
Alessandro

[11] Patent Number: 6,037,870
[45] Date of Patent: Mar. 14, 2000

[54] DECTOR SYSTEM FOR ACCESS CONTROL, AND A DETECTOR ASSEMBLY FOR IMPLEMENTING SUCH A SYSTEM

[76] Inventor: Manneschi Alessandro, 15 Via XXV Aprile, I-52100 Arezzo, Italy

[21] Appl. No.: 09/256,653

[22] Filed: Feb. 23, 1999

[30] Foreign Application Priority Data

Feb. 25, 1998 [IT] Italy ................... TO98A0146

[51] Int. Cl.[7] ............................................. G08B 13/14
[52] U.S. Cl. ..................... 340/572.1; 340/572.9; 324/224
[58] Field of Search ................. 340/693.2, 571, 340/572.1, 572.2, 572.3, 572.4, 572.5, 572.6, 572.7, 572.8, 572.9, 552, 561, 562, 825.31, 825.34, 825.32; 324/224, 244, 251, 257, 258, 260

[56] References Cited

U.S. PATENT DOCUMENTS

| | | | |
|---|---|---|---|
| 3,891,980 | 6/1975 | Lewis et al. | 340/258 |
| 4,821,023 | 4/1989 | Parks | 340/551 |
| 4,866,424 | 9/1989 | Parks | 340/551 |

Primary Examiner—Jeffery A. Hofsass
Assistant Examiner—Daniel Previl
Attorney, Agent, or Firm—Levine & Mandelbaum

[57] ABSTRACT

The present invention provides a detector system for access control, the system comprising: transmitter coils; associated receiver coils; transponders suitable for generating identifiable signatures; and processor circuits adapted firstly to detect a weapon passing between the transmitter and receiver coils by analyzing variations in the signal received by the receiver coil, and secondly to detect the identifiable signature of a transponder on the basis of the signal received by the receiver coils; wherein: the transmitter coils are adapted to generate respective frequencies, firstly for exciting and detecting any weapons passing between the transmitter and receiver coils, and secondly for activating transponders; the transponders have means suitable for powering their internal circuits electrically from the signal received at the "activation" frequency; each weapon excitation and detection frequency is very different from each frequency used for activating transponders and for transponder signatures; and the signals used for detecting transponders are taken from the outputs of receiver coils that are also used for detecting weapons.

21 Claims, 2 Drawing Sheets

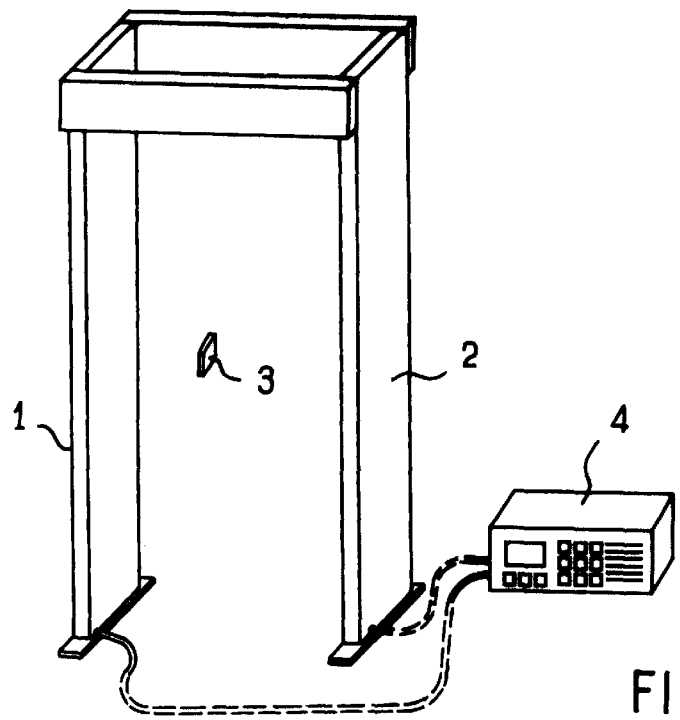
FIG_1
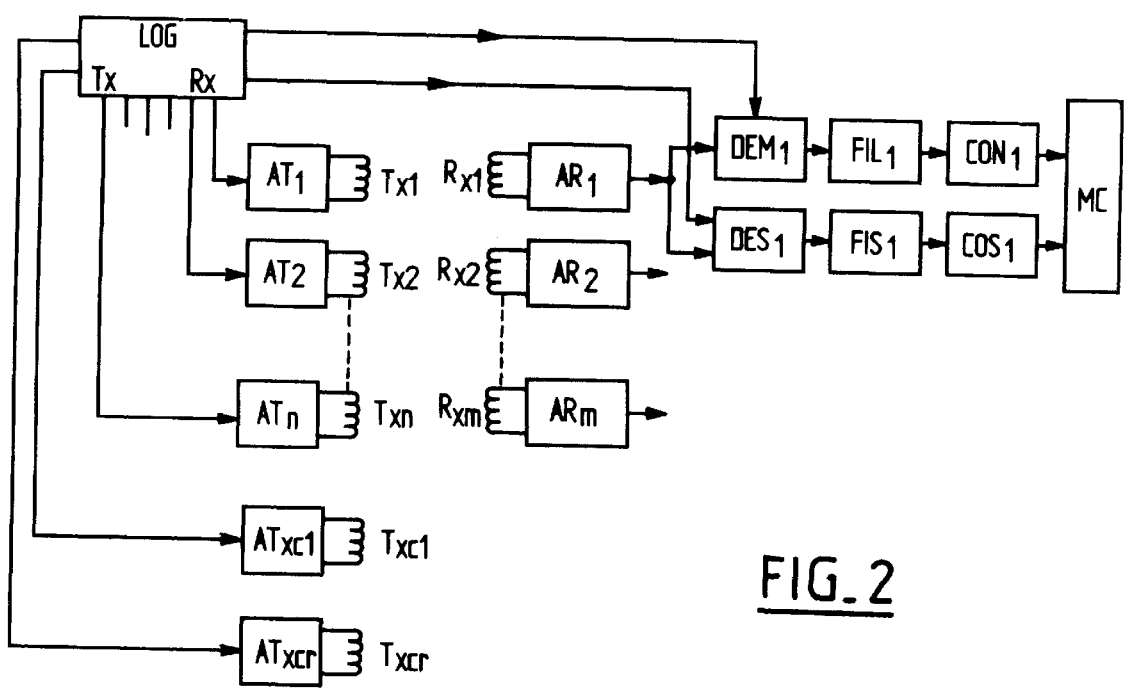
FIG_2

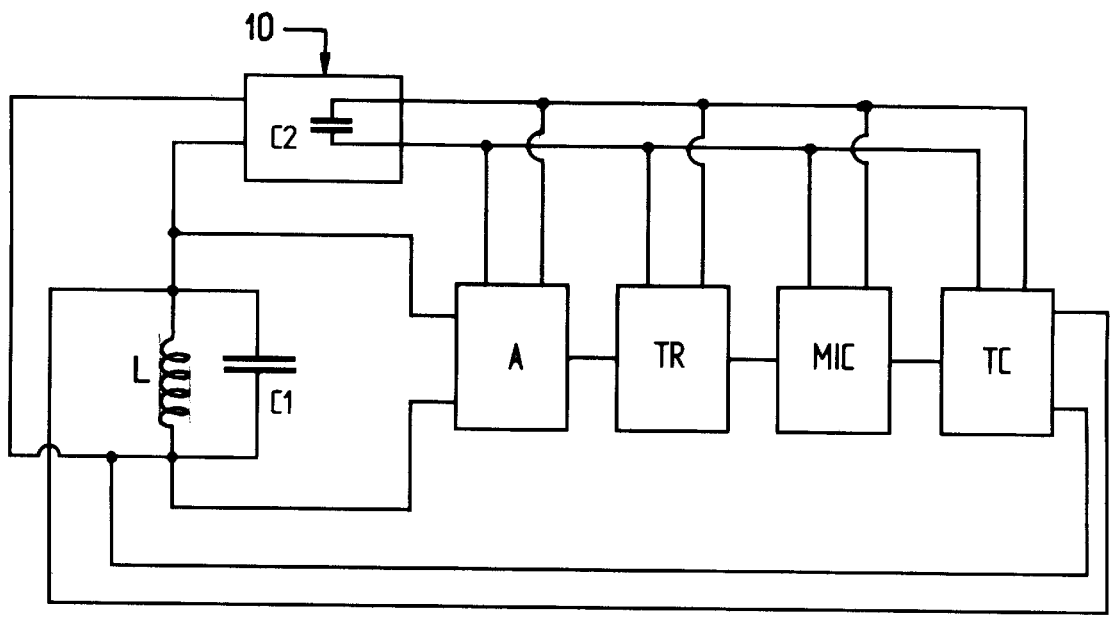
FIG_3
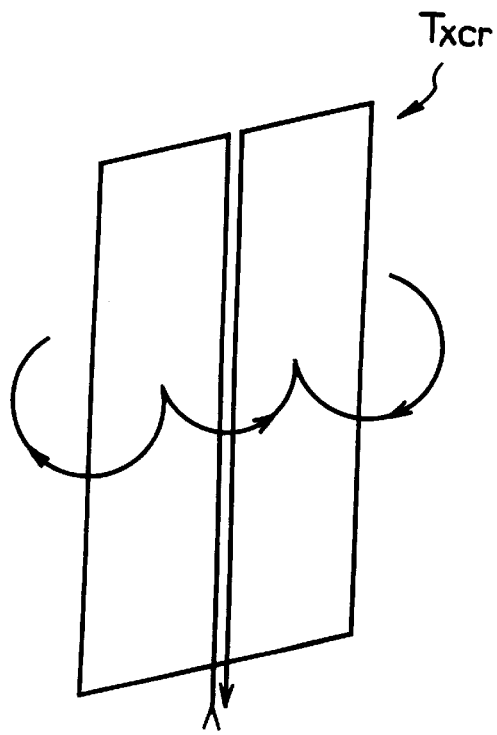
FIG_4
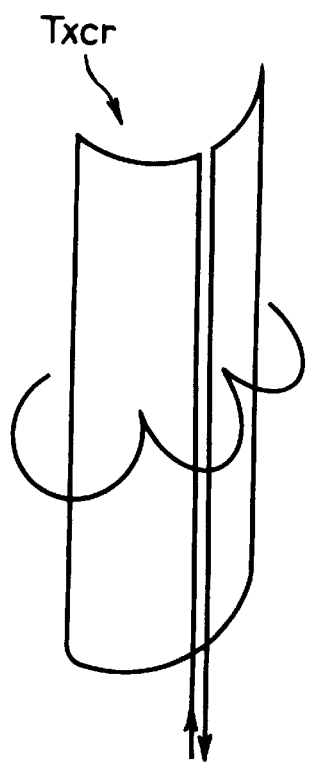
FIG_5

DECTOR SYSTEM FOR ACCESS CONTROL, AND A DETECTOR ASSEMBLY FOR IMPLEMENTING SUCH A SYSTEM

FIELD OF THE INVENTION

The present invention relates to the field of access control devices.

Applications for the present invention can be found in controlling access at the entrance to numerous sites, such as and without any limitation: banks, embassies, military installations, airports, etc.

More precisely, the present invention relates to a device which combines a metal detector in order to detect any weapons, and a transponder detector in order to detect and optionally authorize passage of authorized persons in spite of a weapon being detected.

BACKGROUND OF THE INVENTION

In this respect, the present invention provides improvements to the means described in documents U.S. Pat. No. 5,523,739.

Metal detectors and transponder detectors have already given rise to abundant literature.

It is known that most metal detectors comprise transmitter coils, receiver coils, and an electronic processor circuit adapted to detect variations in the signals received by the receiving coils relative to a reference value.

Still more precisely, present-day metal detector systems generally satisfy the following criteria.

Firstly, the coils, both the transmitter coils and the receiver coils are of the multipolar type, i.e. they are in an 8-shape or the equivalent, so as to present alternating poles of opposite sign so as to cancel out or minimize interfering signals, e.g. as induced by metal masses or magnetic field sources placed close to but outside the detection space as defined by the transmitter and receiver coils.

Secondly, there are preferably a multiplicity of transmitter coils configured to generate multidirectional magnetic fields so as to guarantee coupling between the magnetic field and a metal mass passing between the transmitter and receiver coils, whatever the path followed by the mass and/or whatever its orientation. Similarly, there are preferably multiple receiver coils configured to detect the influence of a metal mass, regardless of the path it follows and/or regardless of its orientation.

Finally, and thirdly, the intensity of the transmitted magnetic fields must be controlled accurately and must remain below acceptable thresholds in order to avoid disturbing the state and/or the operation of certain authorized apparatuses that may pass between the transmitter and receiver coils, for example heart pacemakers.

Document U.S. Pat. No. 5,523,739 describes a system of the type shown diagrammatically in accompanying FIG. 1 which system combines a metal detector and a transponder detector for the purpose of enabling authorized people carrying a transponder to pass through the access even if they are carrying a weapon, without it being necessary for such people to draw attention to themselves by any detectable operation, such as keying a special number on a keypad or subjecting themselves to biometric reading, in particular of a fingerprint. Such detectable operations can be very harmful to the security of such people who are thus identified as being unusual.

More precisely, and as described in document U.S. Pat. No. 5,523,739, a system comprising:

transmitter coils 1 suitable for generating magnetic fields at audiofrequencies "foi";

associated receiver coils 2;

transponders 3 each having an on-board electrical power supply, at least one coil closed by a high impedance circuit for the signals at the audiofrequency "foi" so that the coil is sensitive to such signals at the audiofrequency "foi" while nevertheless picking up little energy at said frequency and consequently not disturbing metal detection, and means for generating an identifiable signature, e.g. a determined code by modulating emission on the coil in response to detecting the audiofrequency "foi"; and processor circuits 4 suitable firstly to detect a weapon passing between the transmitter and receiver coils 1 and 2 by analyzing variations in a signal associated with the audiofrequency "foi" received by the receiver coils 2, and secondly for detecting the identifiable signature from the transponder 3.

The means proposed in document U.S. Pat. No. 5,523,739 thus make it possible to combine and integrate neatly a metal detector and a transponder detector in spite of apparent incompatibility between detectors of those two types, particularly as to the configuration of the detection coils used, the frequencies involved, and the intensities required, as explained in the preamble of document U.S. Pat. No. 5,523,739.

Nevertheless, the means described in document U.S. Pat. No. 5,523,739 have yet to be developed industrially on the large scale expected from the marked advantages that such means offer compared with the state of the art.

That would appear to be due in particular to the fact that if the power supply on the transponder fails, the system ceases to operate, since it deems any person carrying a weapon to be an unauthorized person even if that person is authorized but is carrying a defective transponder, without there being any reason why the person should be aware that the transponder is defective and understand why access is being refused exceptionally.

Another problem is the cost of a transponder with an in-built battery, and this factor limits commercialization to applications where large numbers of transponders are required. Another negative factor of battery transponders is their limited lifetime which makes the apparatus unusable after being active for a certain length of time.

The problems encountered in this way have not yet been solved in satisfactory manner, since any modification of the system relative to the means described in document U.S. Pat No. 5,523,739 fails because of the incompatibilities of principle that exist between metal detectors and hands-free transponder detectors, as recalled above.

OBJECTS AND SUMMARY OF THE INVENTION

Nevertheless, an object of the present invention is now to provide novel means enabling a metal detector and a transponder detector to be combined, while avoiding the drawbacks of previously known dispositions.

In the context of the present invention, this object is achieved by a detector system which comprises:

transmitter coils;

associated receiver coils;

transponders suitable for generating identifiable signatures; and processor circuits adapted firstly to detect a weapon passing between the transmitter and receiver coils by analyzing variations in the signal received by the receiver coil, and secondly to detect the identifiable signature of a transponder on the basis of the signal received by the receiver coils;

wherein:

the transmitter coils are adapted to generate respective frequencies, firstly for exciting and detecting any weapons passing between the transmitter and receiver coils, and secondly for activating transponders;

the transponders have means suitable for powering their internal circuits electrically from the signal received at the "activation" frequency;

each weapon excitation and detection frequency is very different from each frequency used for activating transponders and for transponder signatures; and the signals used for detecting transponders are taken from the outputs of receiver coils that are also used for detecting weapons.

According to an advantageous characteristic of the present invention, at least a portion of the processor means situated downstream from the receiver coils is common between the weapon detection means and the transponder detection means.

According to another advantageous characteristic of the present invention, the weapon excitation and detection frequency does not constitute a multiple or a submultiple of any of the frequencies implemented for activating the transponders and for the signatures thereof.

According to another advantageous characteristic of the present invention, the weapon excitation and detection frequency is lower (e.g. in the range 3 kHz to 6 kHz) than the frequencies used for activating the transponders (e.g. about 125 kHz).

According to yet another advantageous characteristic of the present invention, there are provided means for ensuring little mutual induction, preferably zero mutual induction, between the transmitter means at the weapon excitation and detection frequency and the transmitter means at the transponder activation frequency.

Transponders having no on-board power supply and consequently powered from radiated energy picked up by means of a coil, for example, are themselves well known (see for example document U.S. Pat. No. 4,822,990). Nevertheless, so far as the inventor is aware, nobody has yet managed to make use of such transponders without an on-board power supply correctly in an access control system that also includes metal detector means.

BRIEF DESCRIPTION OF THE DRAWINGS

Other characteristics, objects, and advantages of the present invention appear on reading the following detailed description and on looking at the accompanying drawings which are given by way of non-limiting example and in which:

FIG. 1, described above, shows a system of the state of the art, e.g. as illustrated in document U.S. Pat. No. 5,523,739;

FIG. 2 is a block diagram of a detector system of the present invention;

FIG. 3 is a block diagram of a transponder of the present invention; and

FIGS. 4 and 5 are two diagrams of the transmitter coil for activating transponders in the present invention.

MORE DETAILED DESCRIPTION

The general structure of a detector system of the present invention is substantially as shown in accompanying FIG. 1.

Thus, the system of the present invention mainly comprises:

transmitter coils 1 suitable for generating magnetic fields;
associated receiver coils 2;
transponders 3; and
processor circuits 4.

As mentioned above, in the context of the present invention, the transmitter coils 1 are adapted to generate respective frequencies Fxi and Fxci, Fxi for exciting and detecting any weapons passing between the transmitter coils 1 and the receiver coils 2, and secondly Fxci for activating the transponders 3.

In addition, the transponders 3 are adapted to generate an identifiable signature, preferably a determined code that modulates a transmission.

In the context of the invention, the transponders 3 have means 10 suitable for electrically powering their internal circuits from the signal received at the "activation" frequency Fxci.

In addition, each weapon excitation and detection frequency Fxi is very different from and preferably not a multiple or submultiple of each frequency Fxci used for activating transponders 3 and used for the signatures thereof.

The use of a weapon excitation and detection frequency Fxi that is very different from the frequencies Fxci used for activating the transponders 3 and used for the signatures thereof, and a frequency which is also not a multiple or a submultiple of the frequencies Fxci, makes it possible firstly to guarantee that the transponders 3 do not absorb energy at the frequency Fxi and consequently do not disturb metal detection, and secondly to avoid the signature as transmitted by a transponder (generally binary modulation) interfering with such metal detection.

Furthermore, the non-coincidence between the transponder frequencies and harmonics of the weapons excitation and detection frequencies guarantees that the transponders are not excited or disturbed by such harmonics.

In practice, the same coils 1 can be used for generating the weapons excitation and detection frequencies Fxi and the frequencies Fxci for activating the transponders 3.

Nevertheless, and preferably in the context of the present invention, different coils are used for generating the respective frequencies Fxi and Fxci.

Furthermore, to generate the transponder activation frequencies Fxci, it is possible to use either a single coil, or else a plurality of electrically-independent coils, depending on the configuration of the system, the access to be controlled, and the desired field.

According to another advantageous characteristic of the invention, the transponder activation frequencies Fxci are much higher than the metal excitation and detection frequencies Fxi.

As a non-limiting example, the weapons excitation and detection frequencies Fxi lie in the range 3 kHz to 6 kHz while the transponder activation frequencies Fxci are about 125 kHz.

Still more precisely, as shown diagrammatically in FIG. 2, it is preferable for the transmitter coils 1 used for detecting metals to comprise a plurality of transmitter coils referenced Tx1, Tx2, . . . , Txn powered by respective amplifiers AT1, AT2, . . . , ATn driven by an electronic control module LOG. The associated receiver coils 2 used for detecting metals comprise a plurality of receiver coils Rx1, Rx2, . . . , Rxm respectively associated with amplifier and preprocessing units AR1, AR2, ARm.

The signals from these units AR1, AR2, . . . , ARm are used to detect the presence of a metal weapon, if any, between the transmitter coils 1 and the receiver coils 2.

For this purpose, the configuration of the transmitter coils Tx1, Tx2, ..., Txn and of the receiver coils Rx1, Rx2, ..., Rxm, and of the associated processing and analysis circuits can be one of many configurations, for example configurations that are known per se and are therefore not described in detail below.

On this topic, reference can be made, for example to the following documents: FR-A-2 610 417, FR-A-2 607 937, FR-A-2 697 919, FR-A-2 698 178, and FR-A-2 698 968.

In addition, as can be seen in FIG. 2, in the context of the present invention, the control module LOG also drives at least one transmitter coil Txc1 ... Txcr via a respective amplifier ATxc1 ... ATxcr for generating the activation frequencies Fxci of the transponders 3.

As mentioned above, and where appropriate, these amplifiers ATxc1 ... ATxcr and the associated coils Txc1 ... Txcr can be the same as the amplifiers AT1, AT2, ATn and the coils Tx1, Tx2, ..., Txn.

Nevertheless, it is preferable for the means that detect metals and the means for detecting the transponders 3 to be formed on the basis of the same receiver coils Rx1, Rx2, ..., Rxm and the same associated amplifiers AR1, AR2, ..., ARm.

For this purpose, as can be seen in FIG. 2, two parallel branches DEM1, FIL1, CON1 and DES1, FIS1, COS1 are provided at the output from at least one of the amplifiers AR1, AR2, ..., ARn, and preferably at the output of each of the amplifiers AR1, AR2, ..., ARm, both parallel branches leading to an analyzer unit MC.

The first branch thus comprise a demodulator DEM1, a filter FIL1, and a converter CON1, adapted to detecting variation in the signals associated with the frequency Fxi.

The second branch comprises a demodulator DES1, a filter FIS1, and a converter COS1, adapted to detecting the signatures of the transponders 3.

The structure of the transponders 3 of the present invention is described below.

Preferably, but in non-limiting manner, the transponders 3 are in the form of cards that are plane, and advantageously cards that are of standardized dimensions.

As shown in FIG. 3, each transponders 3 preferably comprises a coil L associated with a capacitor C1 tuned to receive the frequencies Fxci. A portion of the energy received in this way is made use of in the abovementioned power supply module 10.

To this end, the power supply module 10 preferably comprises a rectifier bridge and a capacitor C2 suitable for storing the rectified energy. This energy is used to power all of the circuits of the transponder 3, i.e. essentially the elements A, TR, MIC, and TC which correspond respectively to an amplifier A for amplifying the signal at the frequency Fxci received by the coil L, a unit TR for detecting the presence of said frequency Fxci, a microprocessor MIC, and a transmitter TC adapted to apply to the coil L a signal that has been modulated with a predetermined identity code specific to the transponder 3 in question.

Thus, when the transponder 3 receives the activation frequency Fxci on its coil L, the capacitor C2 is charged to power the transponder, and the coil L transmits the signature (a signal modulated by a code) under the control of the system constituted by the elements A, TR, MIC, and TC.

The analyzer module MC is thus adapted to detect the presence of metals, and in particular weapons, between the transmitter and receiver coils 1 and 2 by analyzing variations in the signal associated with the frequency Fxi at the receiver coils 2, and also to detect the possible presence of an authorized transponder 3 so as to avoid preventing access to a person carrying a weapon but authorized by such a transponder.

The effect generated by the analysis module MC, specifically when it detects a weapon carried by an unauthorized person, can take various forms. Access may be prevented mechanically, a recording may be made, a person can be put under surveillance, an optical, audible, or computer signal may be issued, or any other appropriate and/or equivalent effect may be generated.

According to another advantageous characteristic of the invention, means are provided for preventing, or at least limiting, mutual induction between the means that transmit at the frequency Fxi and the means that transmit at the frequency Fxci so as to avoid intermodulation phenomena (differences or sums of the fundamental frequencies used or of their harmonics), thereby avoiding disturbance both in detecting metals and in detecting transponders. For this purposes, various means can be provided.

In a first variant, it is possible to adapt the shape of the respective coils Tx1, Tx2, ..., Txn and Txci, ..., Txcr to avoid or minimize coupling between them.

In another variant, mutual induction can be prevented or limited by controlling the timing of transmissions at the frequencies Fxi and Fxci so as to prevent them overlapping in time.

In certain configurations, the width of the passage allowed between the transmitter coils 1 and the receiver coils 2 is quite large. Under such circumstances, to avoid transmitting too great an intensity at the frequencies Fxci to guarantee activating the transponders 3 regardless of the position thereof in the passage, provision can be made to place activation coils Txc1, Txcr on both sides of the authorized passage. In this context, preventing or limiting mutual induction between the metal detector means and the transponder detector means is of fundamental importance to avoid saturating the metal detector means.

Where appropriately, it is also possible to place transmitter coils and receiver coils at the metal detection frequency Fxi on both sides of the passage.

As shown in FIGS. 4 and 5, respectively for plane, panel type coils and for three-dimensional, column type coils, the transmitter coils Txcr for the transponder activation frequency Fxci are preferably multipolar, e.g. being in a two-pole configuration. More precisely, the loops forming the various poles are preferably juxtaposed in a horizontal direction, i.e. they are encountered in succession when moving horizontally and not vertically.

These coils and loops are shown diagrammatically as single strands. In practice, they are nevertheless preferably constituted by a plurality of strands.

Such multipolar coils with horizontally juxtaposed loops present the advantage of generating multiple diverging fields as represented under reference Ch in FIGS. 4 and 5, which are well suited to activating transponders 3 wherever they happen to be located on a bearer and whatever the orientation thereof on going through the passage. The person skilled in the art will understand that transponders in the form of cards are generally in a vertical position in a bearer's pocket, the coil L formed by turns disposed on the card then necessarily picking up a fraction of the energy at the frequency Fxci since on going through the access passage the turns in question will necessarily cut field lines at an appropriate orientation.

Naturally, the present invention is not limited to the particular embodiment described above, but extends to any variants coming within its spirit.

For example, where appropriately, the abovementioned inductive means L that are provided on the transponder 3 for picking up energy at the frequency Fxi could be replaced with the circuits of the transponder 3 being powered by capacitive means.

I claim:

1. A detector system for access control, the system comprising:

transmitter coils;

associated receiver coils;

transponders suitable for generating identifiable signatures; and processor circuits adapted firstly to detect a weapon passing between the transmitter and receiver coils by analyzing variations in the signal received by the receiver coil, and secondly to detect the identifiable signature of a transponder on the basis of the signal received by the receiver coils;

wherein:

the transmitter coils are adapted to generate respective frequencies, firstly for exciting and detecting any weapons passing between the transmitter and receiver coils, and secondly for activating transponders;

the transponders have means suitable for powering their internal circuits electrically from the signal received at the "activation" frequency;

each weapon excitation and detection frequency is very different from each frequency used for activating transponders and for transponder signatures; and the signals used for detecting transponders are taken from the outputs of receiver coils that are also used for detecting weapons.

2. A system according to claim 1, wherein at least a portion of the processor means situated downstream from the receiver coils is common between the weapon detection means and the transponder detection means.

3. A system according to claim 1, wherein the weapon excitation and detection frequency does not constitute a multiple or a submultiple of any of the frequencies implemented for activating the transponders and for the signatures thereof.

4. A system according to claim 1, wherein the weapon excitation and detection frequency is lower than the frequencies used for activating the transponders.

5. A system according to claim 1, wherein the weapon excitation and detection frequency lies in the range 3 kHz to 6 kHz.

6. A system according to claim 1, wherein the transponder activation frequency is about 125 kHz.

7. A system according to claim 1, including means for ensuring little mutual induction, preferably zero mutual induction, between the transmitter means at the weapon excitation and detection frequency and the transmitter means at the transponder activation frequency.

8. A system according to claim 1, wherein the transponders are adapted to generate a determined code by modulating a transmission.

9. A system according to claim 1, wherein the coils that generate the weapon excitation and detection frequencies are common to the coils that generate the transponder activation frequencies.

10. A system according to claim 1, wherein the coils generating the weapon excitation and detection frequencies are different from the coils generating the transponder activation frequencies.

11. A system according to claim 1, wherein a single coil is provided for generating the transponder activation frequencies.

12. A system according to claim 1, wherein a plurality of coils are provided for generating the transponder activation frequencies.

13. A system according to claim 1, wherein at least one of the receivers coils is associated with two parallel branches leading to an analyzer unit, the first branch comprising a demodulator, a filter, and a converter adapted to detecting variation in the signals associated with the weapon excitation and detection frequency, and the second branch comprising a demodulator, a filter, and a converter adapted to detecting transponder signatures.

14. A system according to claim 1, wherein the transponders are in the form of cards that are plane.

15. A system according to claim 1, wherein the transponders comprises a coil associated with a power supply module comprising a rectifier bridge and a capacitor suitable for storing the rectified energy.

16. A system according to claim 1, wherein each transponder comprises a unit for detecting the presence of the activation frequency, a microprocessor, and a transmitter module adapted to apply to the coil a signal that has been modulated by a predetermined identity code specific to the transponder in question.

17. A system according to claim 7, wherein the means for preventing or at least limiting mutual inductance between the transmitter means at the metal detection frequency and the transmitter means at the transponder activation frequency corresponding to the shapes of the respective coils which are adapted to avoid or minimize any coupling therebetween.

18. A system according to claim 7, wherein the means for preventing or at least limiting mutual inductance between the transmitter means at the metal detection frequency and the transmitter means at the transponder activation frequency correspond to timing transmission at the various frequencies so as to avoid them overlapping in time.

19. A system according to claim 1, wherein activation coils are provided on both sides of the authorized passage.

20. A system according to claim 1, wherein the transmitter coils for the transponder activation frequency are multipolar coils, e.g. having two poles in the form of coils that are juxtaposed in the horizontal direction.

21. A detector assembly for implementing a system according to claim 1, the assembly comprising:

transmitter coils;

associated receiver coils; and processor circuits adapted firstly to detect a weapon passing between the transmitter and receiver coils by analyzing variations in the signal received by the receiver coils, and secondly to detect the identifiable signature of a transponder from the signal received by the receiver coils;

wherein:

the transmitter coils are adapted to generate respective frequencies, firstly for exciting and detecting any weapons passing between the transmitter coils and the receiver coils, and secondly for activating transponders;

each weapon excitation and detection frequency being very different from each frequency used for activating transponders and for the signatures thereof; and the signals used for detecting the transponders are taken from the outputs of receiver coils that are also used for detecting weapons.

* * * * *

UNITED STATES PATENT AND TRADEMARK OFFICE
CERTIFICATE OF CORRECTION

PATENT NO : 6,037,870
DATED : Mar. 14, 2000
INVENTOR(S): Manneschi

It is certified that error appears in the above-identified patent and that said Letters Patent are hereby corrected as shown below:

First page, first column, under "Foreign Application Priority Data", change "TO98A0146" to --TO98A000146--

Signed and Sealed this

First Day of May, 2001

Attest:

NICHOLAS P. GODICI

Attesting Officer

Acting Director of the United States Patent and Trademark Office